(12) United States Patent
Slopack

(10) Patent No.: US 6,605,211 B1
(45) Date of Patent: Aug. 12, 2003

(54) ONE-PIECE UNDERDRAIN FOR SWIMMING POOL FILTERS

(75) Inventor: Herbert N. Slopack, Markham (CA)

(73) Assignee: Jacuzzi Leisure Products, Etobicoke (CA)

( * ) Notice: Subject to any disclaimer, the term of this patent is extended or adjusted under 35 U.S.C. 154(b) by 0 days.

(21) Appl. No.: 09/684,216

(22) Filed: Oct. 6, 2000

(51) Int. Cl.⁷ .......................... E04H 4/16; B01D 24/14; B01D 24/46
(52) U.S. Cl. .................. 210/169; 210/232; 210/275; 210/279; 210/289; 210/416.2
(58) Field of Search ................... 210/169, 232, 210/263, 275, 279, 288, 289, 416.2, 287

(56) References Cited

U.S. PATENT DOCUMENTS

| | | | |
|---|---|---|---|
| 3,011,643 A | * 12/1961 | McCoy | |
| 3,143,500 A | * 8/1964 | Damgaard | |
| 3,276,588 A | * 10/1966 | Nehrbass et al. | |
| 3,455,458 A | * 7/1969 | Johnson | |
| 3,625,365 A | 12/1971 | Armstrong et al. | 210/232 |
| 3,747,768 A | * 7/1973 | Barrera | |
| 3,770,127 A | * 11/1973 | White | |
| 4,105,555 A | 8/1978 | Pease | 210/136 |
| 4,200,536 A | 4/1980 | Kaufman | 210/279 |
| 4,478,716 A | * 10/1984 | Hasegawa et al. | |
| 4,657,673 A | 4/1987 | Kessler | 210/108 |
| 4,753,726 A | 6/1988 | Suchanek | 210/232 |
| 4,997,558 A | 3/1991 | Baker | 210/143 |
| 5,068,033 A | 11/1991 | Tobias et al. | 210/169 |
| 6,059,967 A | 5/2000 | Field | 210/247 |

* cited by examiner

Primary Examiner—David A. Simmons
Assistant Examiner—Fred Prince
(74) Attorney, Agent, or Firm—Thomas R. Lampe

(57) ABSTRACT

The present invention relates to pool filters. An underdrain design is disclosed that primarily relies on a peripheral ring rather than lateral projections to transfer the water to the sand. The ends of the ring are not joined so that the ring is not closed. The ring is also bent into a helical shape which allows the ring to be screwed into an opening with a smaller diameter than that of the ring. The ring is radially slotted so that water flows radially from it in all directions both toward the center of the tank and away from the center, as well as straight up and down. Since the water transfer takes place primarily along an arc located relatively near the mid-point between the center and the perimeter of the tank, the disadvantages inherent in the concentration of the water flow at the center of the tank are eliminated.

22 Claims, 2 Drawing Sheets

ONE-PIECE UNDERDRAIN FOR SWIMMING POOL FILTERS

FIELD OF THE INVENTION

The present invention relates to filters for removing contaminants from swimming pools.

BACKGROUND OF THE INVENTION

Swimming pool sand filters typically include both a tank containing sand and an underdrain positioned at the bottom of the tank. The term "underdrain" denotes the apparatus which, when installed into the sand-filled tank, controls the transmission of the swimming pool water. The underdrain can perform either of two distinct functions depending on the direction of the water flow. If the water initially flows through the sand, and only subsequently into the underdrain, the system operates to filter contaminants from the water. Contaminants in the water are trapped in the sand as they flow towards the underdrain. The filtered water will then enter the underdrain and be returned to the swimming pool.

If the flow is reversed such that water from the pool is initially piped into the underdrain at the bottom of the sand-filled tank, and only then dispersed into the sand, the system operates to wash contaminants from the, sand. This type of operation is known as backwashing.

In order to maximize performance, the underdrain should function to force the water to flow through the largest possible portion of the sand so as to produce the greatest filtering action or, alternatively, so as to produce the greatest cleansing action.

Prior art underdrain designs as illustrated in FIG. 1 typically consist of a central manifold 10 that directs the water to or from multiple lateral projections 20 that extend from the manifold 10 like the spokes on a wheel hub. The lateral projections 20 include small slots or perforations which permit the passage of water, but prevent the passage of sand 30. Accordingly, the water is transferred to or from the sand 30 in a spoked pattern that roughly covers the area of the tank bottom.

Since the distribution pattern resembles radial spokes, the total flow of water at any radial distance from the manifold remains a constant. For example, if the total flow is 10 gal/min at 5" from the center of the tank 40, then the total flow at 8" from the center of the tank 40 would also be 10 gal/min. However, since the circumference at 8" is around 50.3" and is 60% larger than the 31.4" circumference at 5", at the greater radial distance the same total flow is distributed over a significantly larger perimetral area.

This problem is accentuated during the backwashing operation. The high flow of water at the center of the tank 40 may form a tunnel through the sand, which will then draw even more water from the outside regions of the tank 40 to this path of least resistance. FIG. 2 illustrates this possibility. The result leaves sand at the outside edge of the tank 40 virtually unwashed and consequently reduces the filtering capacity of the system. As a result, the user must backwash more often in order to maintain the filtering capacity at an acceptable level.

The spoked design also makes installation of the underdrain somewhat difficult. Since the spoked underdrain cannot fit through the tank opening in one piece, the laterals 20 usually have to be screwed into the manifold 10 after they are placed inside the tank 40. This operation must typically be performed using only one hand that is inserted through a relatively narrow opening at the top of the tank 40.

One prior art design utilizes hinged or pivoted connections between the lateral projections and the manifold, such that the complete assembly can be installed at one time. The installer then only has to reach into the tank to pivot the laterals downward into position. The problem with this design is that once installed, the hinges eventually become clogged with sand and lose functionality. Once this happens, the underdrain cannot be removed without damaging it.

SUMMARY OF THE INVENTION

It is an object of the present invention to provide an underdrain that both can be installed and/or removed in one piece, without any disassembly or hinge manipulation, and that distributes the water flow to the entire tank bottom area. The one-piece underdrain design according to the present invention addresses both performance and installation issues. Rather than lateral projections, the design primarily relies on a peripheral ring to transfer the water to the sand. The ends of the ring are not joined so that the ring is not closed. The ring is also bent into a helical shape which allows the ring to be screwed into an opening with a smaller diameter than that of the ring. As a result no assembly by the user is required in order to complete installation.

DETAILED DESCRIPTION OF THE INVENTION.

Figure 3:
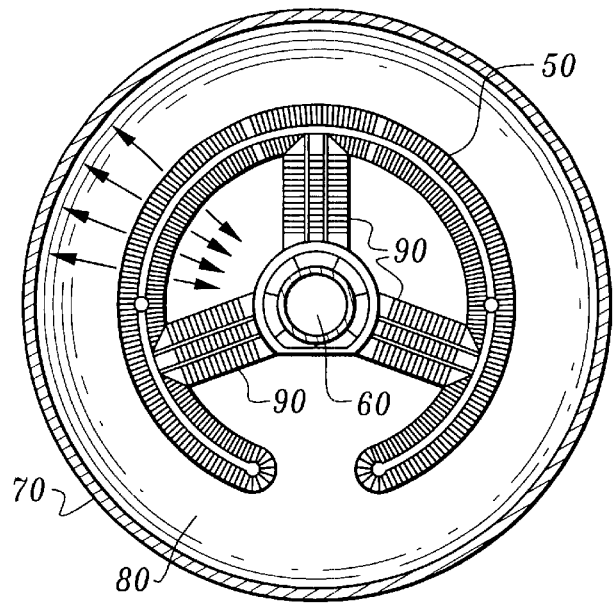
FIG. 3 is a plan view of an underdrain design according to the present invention showing the interior of a filter tank with the underdrain in place.

FIG. 3 illustrates the underdrain of the present invention. The one-piece underdrain design according to the present invention addresses both performance and installation issues. The design does not utilize lateral projections as its primary method of water distribution, but instead primarily uses a 10" diameter ring 50 to transfer the water to and from the sand 80 along its perimeter. Typically, the underdrain design of the present invention may be formed from a thermoplastic. As used herein, the diameter of an underdrain assembly may be defined as the diameter of the smallest cylinder that entirely contains the underdrain assembly. As used herein, the term "underdrain" assembly denotes a fully assembled underdrain.

The ring 50 has two ends that are not joined and is bent into helical shape. As a result of the 'C' shape of the ring 50, the underdrain can be turned or screwed into place within the tank 70 through a reduced diameter opening 72 in the upper end of the tank. The opening 72 has a diameter of only 8", and a resultant cross-section significantly less than that of the tank. No user assembly of the underdrain is required after its insertion into the tank. All that is necessary to insert the underdrain into the tank is to direct one of its free ends through the opening 72 while turning the underdrain relative to the tank.

During filtering, water is sucked into the underdrain along an arc in between the tank's center and perimeter. This scenario forces water to travel through a larger distribution of sand before entering the underdrain than it would if the primary suction point was at the center.

During backwashing, water is received at the central manifold 60 of the underdrain, which central manifold 60 is joined to a supply pipe (not shown in FIG. 3). From the manifold 60, the water from the pool flows along three lateral projections 90 to the ring 50.

The ring 50 is radially slotted so that water flows radially from it in all directions, both towards the center of the tank 70 and away from the center, as well as up and down. The lateral projections 90 may also be perforated to create added water flow. Since the water transfer takes place primarily along an arc located relatively near the mid-point between the center and the perimeter of the tank 70, the disadvantages of the concentration of the water flow at the center of the tank 70, and the resulting 'tunneling effect' through the sand during backwashing, are eliminated.

Figure 1:
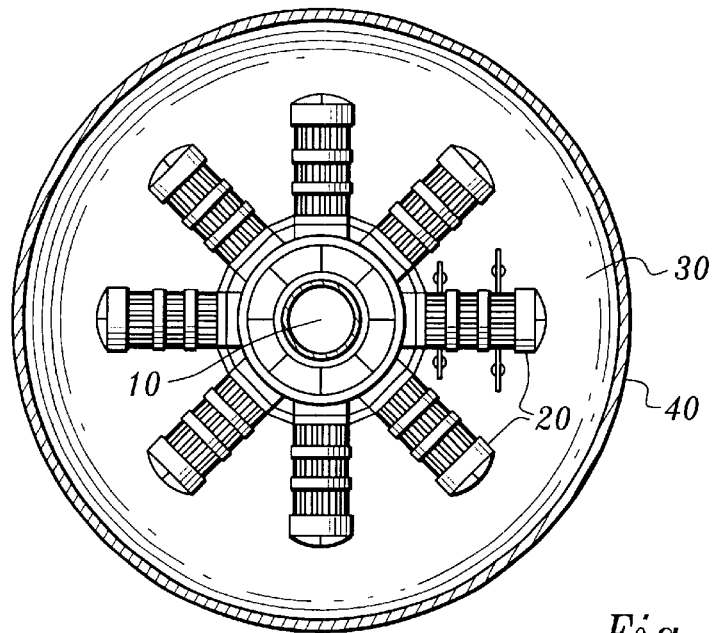
FIG. 1 is a plan view of a prior art underdrain design showing the interior of a filter tank with the underdrain in place.
Figure 2:
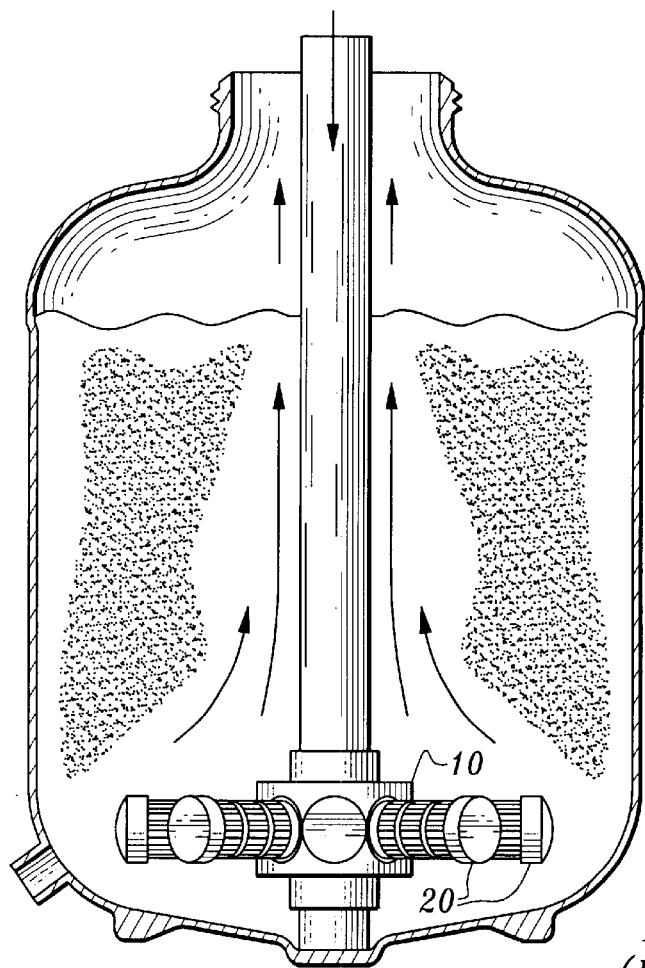
FIG. 2 is an elevational view of a pool filter employing the design of FIG. 1, showing the circulation of water during backwashing.
Figure 4:
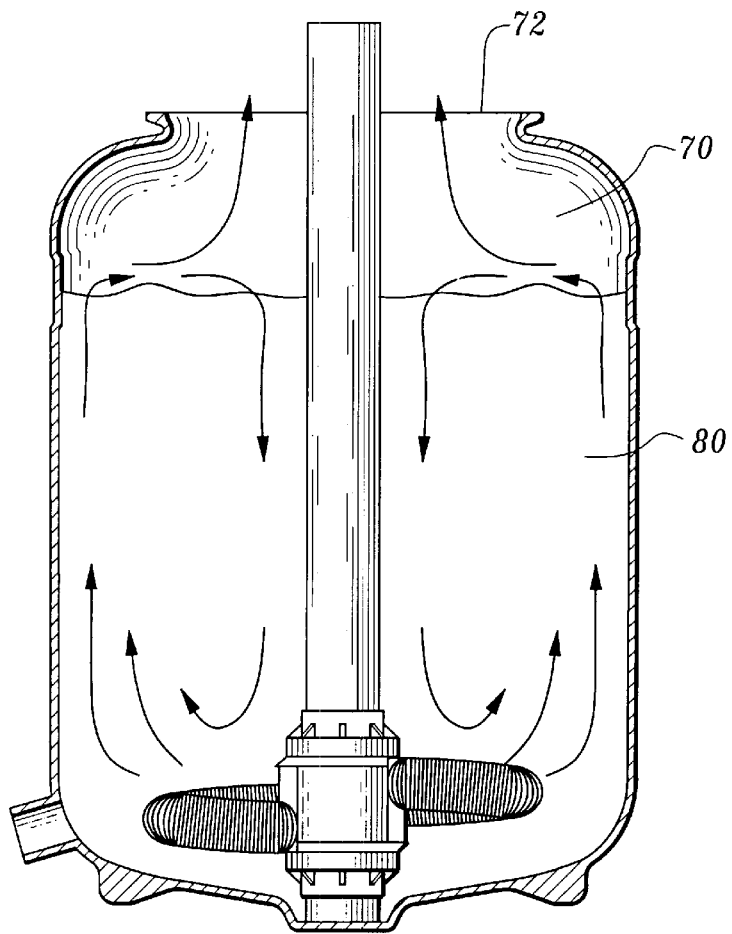
FIG. 4 is an elevational view of a pool filter employing the design of FIG. 3 according to the present invention, showing the circulation of water during backwashing.

The design of the present invention also promotes better backwashing by inducing sand circulation. Because the underdrain ring 50 distributes the water to the sand 80 located towards the periphery of the tank 70, the water tends to carry the sand first upwards, and then inwards, as illustrated in FIG. 4. The phrase "sand circulation", as used herein, refers to this circulation of sand induced by this flow. As a result of this induced sand circulation, there is much more movement of the sand, and subsequently better and more uniform cleansing. In prior art designs, most of the water flows straight up the middle and out of the opening, as illustrated in FIG. 2, which flow provides no means of circulating the sand at the outer part of the tank. By using the underdrain of the present invention a greater portion of the sand in the tank is properly washed, so that more sand is made is available to actually contribute to the filtering operation. This additional active filtration media increases the filter system's effectiveness and allows for longer intervals between backwashing operations.

The scope of the present invention is meant to be that set forth in the claims that follow and equivalents thereof, and is not limited to any of the specific embodiments described above.

What is claimed is:

1. A filtering system for a pool comprising:
   a tank with an tank opening having a first diameter; and
   an underdrain assembly having a second outer diameter greater than said first diameter and such that no part of said underdrain assembly is movable relative to any other part of said underdrain assembly, and further wherein said underdrain assembly is adapted to fit through said tank opening to be installed in said tank.

2. A filtering system as recited in claim 1 further wherein said second diameter is at least 10% greater than said first diameter.

3. A filtering system as recited in claim 1 further wherein said second diameter is at least 20% greater than said first diameter.

4. A filtering system as recited in any of claim 1, 2, or 3, further wherein at least a portion of said underdrain assembly has a generally helical shape so that said underdrain assembly is adapted to fit through said tank opening.

5. A filtering system as recited in any of claim 1, 2, or 3, further wherein said underdrain assembly includes a central manifold connected to one or more helical tubes.

6. A filtering system as recited in any of claim 1, 2, or 3, further wherein said underdrain assembly includes a central manifold connected to one or more perforated helical tubes.

7. An improved sand filter comprising:
   (a) a tank of a given cross-section having an opening in one end thereof of a cross-section less that the given cross-section;
   (b) an underdrain of a generally helical configuration having an outer diameter greater than the cross-section of the opening, said underdrain being at least partially perforated and having a free end whereby the underdrain may be inserted into the tank by feeding said free end into the opening as the underdrain is turned relative to the tank; and,
   (c) a manifold connected in fluid communication with the underdrain, said manifold comprising a conduit located generally centrally of the underdrain and one or more laterals secured in fluid communication between the conduit and the underdrain.

8. An underdrain according to claim 7 wherein the laterals are perforated.

9. An underdrain according to claim 8 wherein the perforated character of the underdrain and laterals is such that increased fluid flow is provided peripherally of the tank, as compared to that provided centrally of the tank.

10. An improved sand filter comprising:
    a) a tank having a reduced diameter opening in one end thereof; and,
    b) an underdrain of a generally C-shaped configuration having an outer diameter greater than that of the opening, said underdrain being at least partially perforated and having a free end whereby the underdrain may be inserted into the tank by feeding said free end into the opening as the underdrain is turned relative to the tank.

11. An underdrain according to claim 10, further comprising a manifold secured in fluid communication with the underdrain.

12. An underdrain according to claim 11 wherein said manifold comprises:
    a) a conduit located generally centrally of the underdrain; and,
    b) one or more laterals secured in fluid communication between the conduit and the underdrain.

13. An underdrain according to claim 12 wherein the laterals are perforated.

14. An underdrain according to claim 13 wherein the perforated character of the underdrain and laterals is such that increased fluid flow is provided peripherally of the tank, as compared to that provided centrally of the tank.

15. An improved method for inserting an underdrain into an opening of reduced diameter in one end of a sand filter tank, comprising:
   a) providing an underdrain of a generally C-shaped configuration having an outer diameter greater than that of the opening, said underdrain being at least partially perforated and having a free end; and,
   b) feeding said free end into the opening as the underdrain is turned relative to the tank.

16. A method according to claim 15 further comprising securing a manifold to the underdrain prior to feeding the free end into the opening.

17. A method according to claim 15 wherein the manifold comprises a pipe disposed generally centrally of the underdrain and one or more laterals secured in fluid communication between the pipe and the underdrain.

18. A method according to claim 17 wherein the laterals are perforated and the perforated character of the underdrain and laterals is such that increased fluid flow is provided peripherally of the tank, as compared to that provided centrally of the tank.

19. A method according to claim 15 wherein the underdrain is provided in a helical configuration to facilitate insertion of the underdrain into the tank as the underdrain is turned relative to the tank.

20. In a pool filtering system comprising:
   (a) a tank;
   (b) sand within the tank; an improved underdrain means for inducing sand circulation within the tank during backwashing.

21. A pool filtering system as recited by claim 20 wherein the underdrain means has a generally helical configuration and is at least partially perforated.

22. A pool filtering system as recited in claim 21 wherein the perforated character of the underdrain means is such that increased fluid flow is provided peripherally of the tank, as compared to that provided centrally of the tank.

* * * * *